United States Patent Office 2,983,642
Patented May 9, 1961

2,983,642

ORGANIC FIBERS IMPREGNATED WITH DINITROSOAMINES

Ching C. Tung, Kirkwood, Mo., assignor to Monsanto Chemical Company, St. Louis, Mo., a corporation of Delaware No Drawing. Filed Mar. 7, 1957, Ser. No. 644,458

11 Claims. (Cl. 154—139)

The present invention relates to a new and improved method for the treatment of fibers. More particularly the invention relates to a method of obtaining improved adhesion or bonding between rubber and various fibers, whether in the form of cord, yarn, fabric or filaments, as well as to the improved products thereby obtained. The invention is particularly applicable to the improvement in adhesion between rubber and natural fibers such as cotton and also between rubber and synthetic fibers such as rayon, nylon and the like.

A primary object of the invention is to improve the bonding of fibers to ruber. A particular object is to provide a chemical treatment for commercial rayon or nylon or other synthetic fibers for the purpose of increasing the adhesion of such fibers to natural or synthetic rubber in reinforced rubber products. Another object is to provide impregnated fibers which adhere to rubber.

Many manufactured rubber articles include fibers in the composition in the form of a sheet, cord or even as filaments. Examples of such compositions are tires, belting, hose, soles and the like. Even under the most favorable bonding conditions heretofore possible, and particularly in service where repeated flexings of the composition occur, separation of the rubber and fiber often results, thereby causing a weakening and frequently a failure of the product. This situation has resulted in developing a demand for a satisfactory agent to improve the adhesion between the cord or fabric and the rubber. It is an object of this invention to provide such an agent.

In accordance with the present invention it has been found that treating a fiber with a nitrosoamino compound and particularly with an N,4-dinitroso-N-substituted aniline increases the adhesion to a rubber as well as imparting other valuable properties. The treating agent, as is hereinafter disclosed, is applied to the fiber by commonly employed processes such as by impregnating the fibers with a water dispersion or solution of the treating agent. The invention will be apparent and understood from the examples and description that follow.

Rayon and nylon tire cord suitable for use in the manufacture of automobile tires were each treated with water dispersions of a nitrosoamino compound such as an N,4-dinitroso-N-substituted aniline. In all cases, the dispersion under test was prepared by agitating 12 parts of the nitrosoamine or the dinitroso compound with 88 parts of water containing ammonium caseinate equivalent to 2% by weight of the nitroso compound taken. The dispersion was obtained in any desirable manner, preferably by use of a Szegvari Attritor. The tire cord was led into and through the dispersion by passing it under an aluminum reel dipping in a body of the dispersion contained in an aluminum container. After the cord was pulled through the treating bath it was air dried. It may be squeegeed after leaving the bath but in practice it was found that this step is not essential. Furthermore, drying at elevated temperature, as for example under a bank of infrared lamps, is feasible if desired.

Rubber compositions were prepared in the well known manner from the following recipes:

|  | Parts by weight | |
| --- | --- | --- |
|  | Base A | Base B |
| Hevea smoked sheets | 100. |  |
| GR-S 1500 [1] |  | 100. |
| Carbon black | 25. | 25. |
| Zinc oxide | 5. | 5. |
| Saturated hydrocarbon softener | 4. | 7.5 |
| Sulfur | 2.75 | 3. |
| Stearic acid | 1. |  |
| N-Cyclohexyl-2-benzothiazolesulfenamide | 0.4 |  |
| Diphenylguanidine | 0.2 |  |
| 2,2'-Dithiobis benzothiazole |  | 1.5 |

[1] Butadiene-styrene copolymer rubber containing 23.5% bound styrene—see GR-S and GR-1 Synthetic Rubbers, published by Federal Facilities Corporation, Washington 25, D.C., Office of Synthetic Rubber, Table C, Revised 3-1-54.

The adhesion of the treated cord to these compositions was determined by placing the cord between sample portions of the unvulcanized stock, vulcanizing the assembly and measuring the force necessary to pull out the cord. The test sample pieces were prepared by use of an improved mold delevoped after experience with the Armstrong mold. In order to avoid distortion of the rubber under stress, thicker rubber sections were used. Complete descriptions of the Armstrong mold are found in India Rubber World, May 1946, pages 213–219. The specimens were H shaped with the cross bar of the H representing cord extending through two sections of the rubber but the rubber was in the form of cylinders ½" in diameter and 1" in height. The mold was composed of four 5" x 18" sections with the top and bottom solid plates to retain the rubber in the cavities of the two perforated plates. The two halves of the inner section were $6/16"$ thick and contained two rows of 10 perforations. Cord channels about $39/1000"$ ran lengthwise across the diameters of the perforations. Overflow channels $1/16"$ deep were provided in both sections (at the top and bottom of the cylinders) to equalize the pressure.

The rubber compositions described hereinbefore as Base A and Base B were extruded and cut into lengths approximately equal to one-half the height of the cylinders and placed on one of the perforated plates. The treated cord was placed across the samples, the second perforated plate, also filled with identical samples, was placed on top and the two perforated plates so built up were placed between the solid plates and the completed assembly vulcanized by heating in a press for 30 minutes at 158° C. The cord was put between each pair of cured cylinders to provide the H-shaped specimens, the sides of the H representing the rubber cylinders. Essentially the quantity measured was the force required to pull a single cord in the direction of its axis from a cylinder of rubber in which one strand of a cord of a given length was embedded. Thus, the quantity measured was the pounds shearing force acting across the cord to rubber interface. The adhesion preferably was measured by a Dillon tester with a jaw speed of the tester moving 12 inches per minute.

In the tables of results that follow, the quantity of the treating agent, that is the nitrosoamine as shown, absorbed by the cord was determined by weighing the dry cord before and after treatment. Thus, the pickup of test material is the percentage by which the cord increased in weight. The pullout value is the pull needed to tear the cord loose from the rubber, while the adhesion coefficient is 100 times the pullout value of the treated cord divided by the pullout value of the untreated cord.

Table I

| Test Compound | Rayon | | | Hevea Base | |
|---|---|---|---|---|---|
| | Pick-up on Cord Percent by Wt. | GR-S Base | | | |
| | | Pullout Value Lbs. | Adhesion Coefficient | Pullout Value Lbs. | Adhesion Coefficient |
| Methyl N-(p-nitrosophenyl)-β-alanine | 11.6 | 9.0 | 112 | 7.4 | 161 |
| N-(2-Chloroallyl)-p-nitrosoaniline | 6.7 | 12.9 | 103 | 7.6 | 133 |
| 3-(p-Nitrosoanilino)-propionamide | 9.0 | 14.0 | 131 | 9.7 | 159 |
| N-(p-Nitrosophenyl)-β-alanine | 6.0 | 10.2 | 124 | 7.7 | 117 |
| 2-(p-Nitrosoanilino)-ethanol | 10.0 | 12.1 | 113 | 10.7 | 175 |
| 3-(p-Nitrosoanilino)-propionitrile | 7.8 | 11.6 | 141 | 10.9 | 202 |
| N-Methyl N,4-dinitrosoaniline | 10.3 | 18.0 | 164 | 14.2 | 222 |
| Methyl-N-nitroso-N-(p-nitrosophenyl)-β-alanine | 9.2 | | | 13.6 | 210 |
| 3-(N,4-Dinitrosoanilino)-propionamide | 6.2 | 23.1 | 175 | 17.9 | 275 |
| 2-(N,4-Dinitrosoanilino)ethanol | 8.7 | 20.3 | 154 | 20.0 | 308 |
| N,4-Dinitrosophenyl-β-alanine | 5.1 | 12.5 | 152 | 10.4 | 193 |
| 3-(N,4-Dinitrosoanilino)-propionitrile | 11.0 | 21.9 | 199 | 17.7 | 300 |

Table II

| Test Compound | Nylon | | |
|---|---|---|---|
| | Pickup on Cord Percent by Wt. | GR-S Base | |
| | | Pullout Value Lbs. | Adhesion Coefficient |
| N-(2-Chloroallyl)-p-nitrosoaniline | 3.8 | 6.3 | 117 |
| 3-(p-Nitrosoanilino)propionamide | 8.7 | 7.3 | 116 |
| N-(p-Nitrosophenyl)-β-alanine | 5.5 | 5.6 | 104 |
| 2-(p-Nitrosoanilino)ethanol | 8.7 | 9.2 | 146 |
| 3-(p-Nitrosoanilino)-propionitrile | 2.8 | 5.9 | 124 |
| N-Methyl-N,4-dinitrosoaniline | 8.0 | 7.2 | 150 |
| 3-(N,4-Dinitrosoanilino)-propionamide | 1.9 | 9.3 | 202 |
| 2-(N,4-Dinitrosoanilino)ethanol | 6.5 | 7.4 | 161 |
| 3-(N,4-Dinitrosoanilino)-propionitrile | 8.3 | 14.2 | 245 |

The drying method followed in drying the treated cord seems not to be a critical factor since substantially the same results were obtained for pullout adhesion when the treated cord was dried by standing over night at room temperature or dried under conditions varying from 1 hour at 70° C. to 5 minutes at 150° C. Other nitroso N-substituted anilines in addition to those particularly mentioned in the various examples are within the invention described. Such compounds are N,4-dinitrosodiphenylamine, N-ethyl-N,4-dinitrosoaniline, N-butyl-N,4-dinitrosoaniline, N-(2-chloroallyl)-N,4-dinitrosoaniline, N-ethyl-N,4-dinitroso-m-phenetidine, N,4-dinitroso-N-propylaniline, 1-nitroso-4-(p-nitrosophenyl)piperazine, N,N'-dinitroso-N,N'-bis(p-nitrosophenyl)ethylenediamine, N-heptyl-N,4-dinitrosoaniline and others.

It is intended to cover all changes and modifications of the examples of the invention herein chosen for purposes of disclosure which do not constitute departures from the spirit and scope of the invention.

This application is a continuation-in-part of copending application Serial No. 503,347, filed April 22, 1955, now abandoned.

What is claimed is:

1. The method of treating organic fiber to enhance the adhesion thereof to rubber which comprises impregnating the organic fiber with nitroso aromatic amine containing nitroso radicals on both nitrogen and carbon in minor amount sufficient to increase the adhesion selected from the group consisting of 1-nitroso-4-(p-nitrosophenyl)piperazine, N,N'-dinitroso-N,N'-bis-(p-nitrosophenyl)ethylenediamine, N-ethyl-N,4-dinitroso-m-phenetidine and N,4-dinitroso-N-substituted aniline wherein the substituent is selected from the group consisting of phenyl, alkyl, carboalkoxy substituted lower alkyl, carbamyl substituted lower alkyl, hydroxy substituted lower alkyl, cyano substituted lower alkyl and chloroallyl.

2. The method of treating organic fiber to enhance the adhesion thereof to rubber which comprises impregnating the organic fiber with N,4-dinitroso-N-alkyl aniline in minor amount sufficient to increase the adhesion.

3. The method of treating organic fiber to enhance the adhesion thereof to rubber which comprises impregnating the organic fiber with N-methyl-N,4-dinitrosoaniline in minor amount sufficient to increase the adhesion.

4. The method of treating organic fiber to enhance the adhesion thereof to rubber which comprises impregnating the organic fiber with 3-(N,4-dinitrosoanilino)propionamide in minor amount sufficient to increase the adhesion.

5. The method of treating organic fiber to enhance the adhesion thereof to rubber which comprises impregnating the organic fiber with N,4-dinitrosophenyl-β-alanine in minor amount sufficient to increase the adhesion.

6. The method of treating organic fiber to enhance the adhesion thereof to rubber which comprises impregnating the organic fiber with 3-(N,4-dinitrosoanilino)propionitrile in minor amount sufficient to increase the adhesion.

7. The method of treating rayon tire cord to increase the adhesion thereof to rubber which comprises impregnating the rayon cord with N-methyl-N,4-dinitrosoaniline in minor amount sufficient to increase the adhesion.

8. The method of treating nylon tire cord to increase the adhesion thereof to rubber which comprises impregnating the nylon cord with N-methyl-N,4-dinitrosoaniline in minor amount sufficient to increase the adhesion.

9. Fiber reinforced vulcanized rubber articles, said fiber being an organic fiber adhered to the vulcanized rubber by means of nitroso-aromatic amine containing nitroso radicals on both nitrogen and carbon selected from the group consisting of 1-nitroso-4-(p-nitrosophenyl)piperazine, N,N'-dinitroso-N,N'-bis-(p-nitrosophenyl)ethylenediamine, N-ethyl-N,4-dinitroso-m-phenetidine and N,4-dinitroso-N-substituted aniline wherein the substituent is selected from the group consisting of phenyl, alkyl, carboalkoxy substituted lower alkyl, carbamyl substituted lower alkyl, hydroxy substituted lower alkyl, cyano substituted lower alkyl and chloroallyl.

10. Fiber reinforced vulcanized rubber articles, said fiber being an organic fiber adhered to the vulcanized rubber by means of N-methyl-N,4-dinitrosoaniline.

11. Fiber reinforced vulcanized rubber articles, said fiber being an organic fiber adhered to the vulcanized rubber by means of 3-(N,4-dinitrosoanilino)propionitrile.

References Cited in the file of this patent
UNITED STATES PATENTS

| 2,050,196 | Sebrell | Aug. 4, 1936 |
| 2,050,197 | Sebrell | Aug. 4, 1936 |
| 2,835,624 | Cousins | May 20, 1958 |

FOREIGN PATENTS

| 522,568 | Great Britain | June 21, 1940 |